United States Patent [19]
Dahlgren et al.

[11] 3,802,895
[45] Apr. 9, 1974

[54] HYDROXYALKYLO XYALKYLENEAMINOMETHYL PHENOLS AND THEIR USE IN THE PRODUCTION OF REGENERATED CELLULOSE

[75] Inventors: Karl Gustaf Lennart Dahlgren, Stenungsund; Frans Adam Kolosh, Molndal; Jan Willy Soderberg, Stenungsund, all of Sweden

[73] Assignee: Mo Och Domsjo Aktiebolag, Ornskoldsvik, Sweden

[22] Filed: May 15, 1972

[21] Appl. No.: 253,390

[52] U.S. Cl.............. 106/164, 106/165, 260/507.9, 264/189
[51] Int. Cl. ....... C08b 21/20, D01f 3/14, D01f 3/22
[58] Field of Search ......... 106/164, 165; 260/507.9; 264/189

[56] References Cited
UNITED STATES PATENTS

| 3,232,779 | 2/1966 | Schonfeldt et al.................. 106/165 |
| 3,434,913 | 3/1969 | Bockno et al...................... 106/164 |
| 3,558,336 | 1/1971 | Baer................................ 106/165 |
| 3,585,239 | 6/1971 | Stein et al........................ 260/570.9 |

FOREIGN PATENTS OR APPLICATIONS

| 1,085,857 | 10/1967 | Great Britain.................. 260/570.9 |

*Primary Examiner*—Allan Lieberman

[57] ABSTRACT

Hydroxylalkyloxyalkyleneaminomethyl phenols are provided, which are useful in improving the stength and facilitating the spinning and filtering of viscose solutions.

16 Claims, No Drawings

HYDROXYALKYLOXYALKYLENEAMINOMETHYL PHENOLS AND THEIR USE IN THE PRODUCTION OF REGENERATED CELLULOSE

Regenerated cellulose is produced by converting cellulose to a soluble compound thereof, and in a subsequent step reforming the cellulose by precipitation or coagulation in the form of films or fibers. The most widely used process of producing regenerated cellulose is the viscose process, in which the cellulose is converted to cellulose xanthate. In this process, cellulose is mercerized with caustic soda to produce alkali cellulose. After squeezing out excess soda, the alkali cellulose is comminuted in a mill, and is then stored for a period of time to undergo aging. Thereupon, carbon disulfide is introduced, whereby cellulose xanthate is formed. The cellulose xanthate is dissolved in dilute alkali to form a viscous solution called viscose. Viscose is filtered and stored for a few days, whereupon it is extruded through fine holes in spinnerets into a spinning bath, which usually comprises sulfuric acid and various salts. The viscose is thereby coagulated and solidified, with reformation of the cellulose in the form of filaments or fibers, which are subjected to washing and other treatments, and then dried. The viscose may also be extruded through slit dies adapted to form films and coagulated, whereupon the regenerated cellulose is obtained in film form.

Regenerated cellulose can also be prepared by the cuprammonium process, which is similar to the viscose process but uses a solution of cuprammonium hydroxide to dissolve the cellulose.

The processes for producing regenerated cellulose are well known, and described in the technical and patent literature.

In the various steps for the production of regenerated cellulose, additives are usually employed to facilitate and improve the process and the regenerated cellulose in various respects. The chemical constitution and properties of the additives determine the manner in which they are used, and the improvements in the process or the regenerated cellulose which they are intended to achieve. Additives are, for example, employed to improve the filtering characteristics of the viscose, or to prevent yarn milkiness, or to reduce gel swelling during the spinning, or as anticlogging agents, or as finishing agents, to soften the finished fiber. Additives are used both in the production of viscose rayon fiber and film and in the production of cuprammonium rayon fiber and film.

The solubility required for a given additive depends upon the stage of the process at which the additive is to be introduced. If the additive is added to the viscose solution, it is desirable that the additive dissolve therein to form a clear solution. If the additive is added to the spinning bath, it is advantageous either if it dissolves to form a clear solution, or if it is finely dispersed therein.

In most cases, in the manufacture of regenerated cellulose fiber and film using the viscose process, the partially regenerated cellulose is subjected to stretching, to obtain a product of increased molecular orientation with improved mechanical characteristics. In order to obtain an optimum stretching effect, modifiers are customarily added to the viscose solution and/or the spinning bath, to retard the regeneration process and thereby make a higher degree of stretching possible, with improved mechanical characteristics in the regenerated cellulose. Modifiers which are used for this purpose include polyoxyethylene glycols and polyoxyalkylene glycol phenol ethers.

It is also important in the spinning of fibers and films from viscose solution to incorporate an additive which increases the filterability and spinnability of the viscose solution. Increased filterability is provided if the additive is capable of reducing the gel particle formation in the viscose solution. Spinnability is improved if the additive is capable of dispersing the resins which accompany the cellulose in the viscose solution from the raw materials from which the solution is prepared. Certain particularly suitable additives give a fiber or film of lesser milkiness and higher brilliancy, owing to a reduction in the amount of gas and resin occlusions in the fiber or film.

However, polyethylene glycols and polyoxyalkylene phenol ethers have no or only a partial effect in reducing the number of gas and resin occlusions. Thus, polyethylene glycols have no appreciable effect either as a resin dispersing agent or as an agent for improving the filterability of the viscose solution. Polyoxyalkylene phenols, particularly polyoxyethylene phenol, have little or no resin dispersing ability, although they have been employed to improve the filterability of the viscose solution.

U.S. Pat. No. 3,558,336, dated Jan. 26, 1971, proposes polyoxyethylene Mannich reaction products as modifiers for improving the strength of the regenerated cellulose. These compounds have the formula:

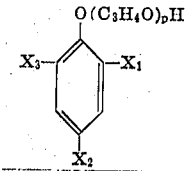

wherein one of the substituents $X_1$, $X_2$, and $X_3$ is an alkyl radical containing from one to three carbon atoms and the other two substituents conform to the formula

wherein each R is independently selected from the group consisting of hydrogen, alkyl radicals containing from one to four carbon atoms and the radical $(C_2H_4O)_pH$, wherein $n$ is an integer from 1 to 3, and $x$ is an integer from 0 to 3 and $p$ may be any number including 0 in any occurrence, such that the ratio of all $p$'s to the number of nitrogen atoms in any molecule does not exceed 30; or the quaternary ammonium derivatives of the compounds characterized by said formula.

However, their properties as additives are unsatisfactory. They give little or no improvement in the spinnability and filterability of the viscose solution. Additives which would both improve strength and also improve spinnability and filterability would fill a particularly serious need in this art.

The British Patents No. 1,002,272, published Aug. 25, 1965, and No. 1,085,857, published Oct. 4, 1967, suggest the use of products similar to those of U.S. Pat. No. 3,558,336. These products are used in the production of foamed polyurethans and improve the flameresistance and dimensional stability of the foam. However, because they are either difficulty soluble or insoluble in viscose solutions, they cannot be used as modifiers or additives in the manufacture of regenerated cellulose.

In accordance with the instant invention, hydroxyalkyloxyalkyleneaminomethyl phenols are provided which are capable of functioning both as modifiers to improve strength and as additives to improve spinnability and filterability of viscose solutions used in the production of regenerated cellulose. These compounds are far superior in this respect to the compounds provided in accordance with U.S. Pat. No. 3,558,336. In addition, they have a good ability to disperse resin in the viscose solutions, as well as to reduce the gel particle content of the viscose solution. As a result of their good resin-dispersing ability, a clearer viscose solution is obtained, which reduces the incidence of encrustations of the channels of the spinnerets, thereby improving spinnability. The reduced content of gel particles gives improved filterability and spinnability, and in addition advantageously influences the mechanical characteristics of the regenerated cellulose.

The hydroxyalkyloxyalkyleneaminomethyl phenols in accordance with the invention are defined by the general formula:

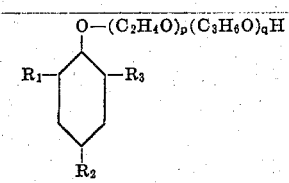

I

In the above formula, $R_1$, $R_2$, and $R_3$ are selected from the group consisting of
  a. one alkyl group having from about five to about twelve carbon atoms;
  b. two alkyl groups having from about one to about four carbon atoms;
  c. the remaining two or one R substituents being

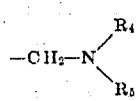

II groups, wherein at least one of $R_4$ and $R_5$ is selected from the group consisting of $C_nH_{2n} O(C_2H_4O)_p(C_3H_6O)_qH$; and    (i)

$(C_2H_4O)_p(C_3H_6O)_qH$    (ii)

and the remaining $R_4$ or $R_5$ is selected from (i), (ii), and iii. lower alkyl having from one to about four carbon atoms; and (iv) 

wherein $R_4$ and $R_5$ are selected from (i), (ii) and (iii), and at least one is (i) or (ii).

In Formulae I and II, $p$ is a number within the range from about one to about 30, and the total number of $C_2H_4O$ units in the compound is within the range from about 10 to about 70, and preferably from about 20 to about 50.

$q$ is a number within the range from zero to about two, and the total number of $C_3H_6O$ units is within the range from zero to about seven.

$n$ is a number within the range from about one to about four.

In the above formulae, $n$, $p$ and $q$ within a given formula can be the same or different, within the ranges stated. It will be understood that $n$, $p$ and $q$ represent average values and need not be integers, but can be fractional numbers within the ranges stated.

Exemplary

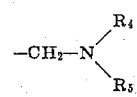

substituents include:

(a) $\quad -CH_2-N\begin{matrix}C_nH_{2n}O(C_2H_4O)_p(C_3H_6O)_qH\\ C_nH_{2n}O(C_2H_4O)_p(C_3H_6O)_qH\end{matrix}$ III.

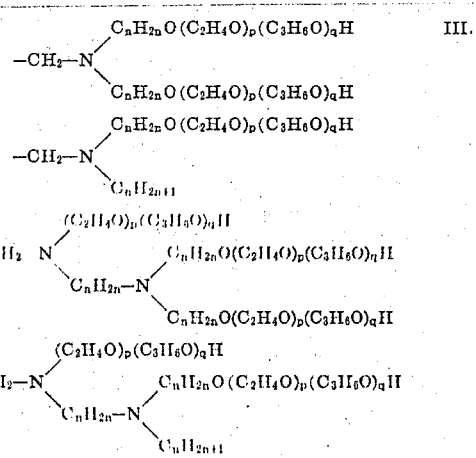

where each $p$ is a number within the range from one to about 30 and selected such that the total number of $C_2H_4O$ units in the general formula is within the range from about 10 to about 70, preferably from 20 to 50, each $q$ is a number within the range from zero to about two and selected such that the total number of $C_3H_6O$ units in the general formula is within the range from zero to about seven, and each n designates a number within the range from about one to about four.

Hydroxyalkyloxyalkyleneaminomethyl phenols having especially good characteristics and constituting a special subclass within the above generic class, have the general formula:

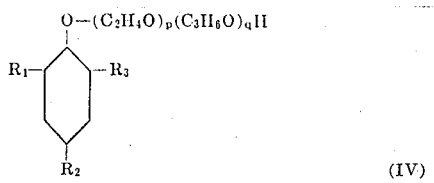

(IV)

in which one of $R_1$, $R_2$, and $R_3$ is an alkyl group having from about five to about twelve carbon atoms, preferably placed in the para position to the phenolic hydroxyl group, and the two remaining R substituents are selected from the group consisting of

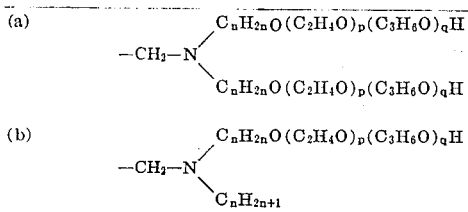

$p$ is a number within the range from about two to about 25, and the total number of $C_2H_4O$ units is within the range from about 20 to about 50.

$q$ is a number within the range from zero to about two and the total number of $C_3H_6O$ units is within the range from zero to about seven.

$n$ is a number within the range from about one to about three.

Especially preferred compounds falling within the invention have the general formula:

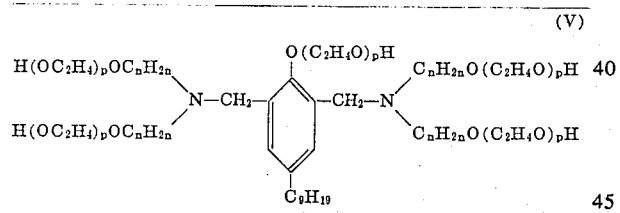

(V)

$p$ is a number within the range from about two to about 20 and is selected so that the total number of $C_2H_4O$ units in the molecule is within the range from about 20 to about 40.

$n$ is two or three.

The hydroxyalkyloxyalkyleneaminomethyl phenols of the invention are readily prepared by a Mannich reaction between the corresponding phenol, formaldehyde and an amine or ammonia corresponding to the $NR_1R_2$ substituent, followed by subsequent addition of ethylene oxide, with an optional terminating addition of 1,2-propylene oxide. The phenol, formaldehyde and nitrogen compounds are reacted in a first stage at a reaction temperature below 100°C., forming an aminomethylphenol reaction product. The molar ratio of the reactants, per mole of the phenol is from 1 to 2 moles of formaldehyde and from 1 to 2.5 moles of the amine or ammonia. Paraformaldehyde can be used as a source of formaldehyde, and has the advantage that it introduces less water into the reaction mixture.

The resulting aminomethyl phenol is then subjected to a further ethoxylation with ethylene oxide, to introduce an amount of ethylene oxide within the range from about 10 to about 70 moles per phenol unit, at a reaction temperature within the range from about 50° to about 200°C., and at a reaction pressure within the range from about 1 to about 10 atmospheres. If desired, water produced during the Mannich reaction can be distilled off before the ethoxylation. The ethoxylation also can be carried out in two or more stages with an intermediate distillation of water from the reaction mixture.

After the ethoxylation, propylene oxide can then be added, in an amount within the range from about 1 to about 7 moles of propylene oxide per phenol unit, under substantially the same reaction conditions as the ethoxylation. Compounds containing a terminating number of propylene oxide units reduce the foaming of the viscose solution, in addition to the other properties mentioned previously.

Phenols which are used as the starting product in the manufacture of the hydroxyalkyloxylalkyleneaminoethyl phenols of the invention have the general formula:

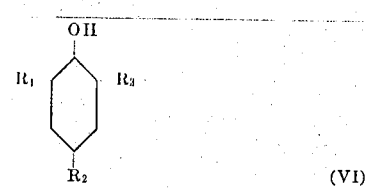

(VI)

In this formula, $R_1$, $R_2$, and $R_3$ are selected from the group consisting of one alkyl group having from about five to about twelve carbon atoms, and two alkyl groups having from about one to about four carbon atoms, the remaining two or one R substituents being hydrogen.

Exemplary suitable phenols include ortho- or para-nonylphenol, ortho- or para-octylphenol, ortho- or para-dodecylphenol, ortho- or para-amylphenol, ortho- or para-heptylphenol, ortho- or para-decylphenol, xylenol, 2,6-diethylbenzene, 2,6-di-propylbenzene, 2,6-dibutylbenzene, 2,4-diethylbenzene, 2,4-dipropylphenol, 2,4-dibutylphenol, 2,4-ditertiarybutylphenol, and 2,6-diisopropylphenol.

The nitrogen compound following the Mannich reaction with the phenol should have at least one active hydrogen remaining, which is capable of further reaction with ethylene oxide. Preferably, secondary alkanol amines containing one or more hydroxyl groups or ammonia are used, but also alkylalkanol amines, primary alkanol amines, and N-aminoalkyl-alkanol amines can be employed. The number of carbon atoms in the alkyl and alkanol chains is within the range from one to about four and preferably from two to three.

Examples of suitable amines in accordance with the invention are diethanolamine, monoethanolamine, dipropanolamine, monopropanolamine, dibutanolamine, monobutanolamine, N-methyl-ethanolamine, N-aminoethyl-ethanolamine, N-methyl-ethylenediamine, and N-ethyl-ethylenediamine.

The reaction between the phenol, formaldehyde and nitrogen compound and the subsequent alkoxylation results in a complex mixture of compounds, the exact composition of which is not fully known. However, the principal components of these mixtures are believed to be the compounds indicated previously, the n, p and q values representing the average values of the mixtures. However, the invention is not limited to mixtures, nor to hydroxyalkyloxyalkyleneaminomethyl phenols prepared by this process. The invention includes single compounds prepared by other processes.

The hydroxyalkyloxyalkyleneaminomethyl phenols of the invention can be added directly to the viscose solution, in which event they are referred to as "modifiers." The amount employed can be within the range from about 0.4 to about 5 percent, preferably from about 0.6 to about 3 percent, based on the cellulose content of the viscose.

Although the addition is preferably to the viscose solution, an advantageous effect is also obtained by addition thereof to the spinning bath, in which event the proportion of the hydroxyalkyloxyalkyleneaminomethyl phenol (also referred to as modifiers) should be within the range from about 5 to about 2000 ppm in the spinning bath.

Usually, the modifier is added when the cellulose xanthate is dissolved in caustic soda, but it can also be added directly to the viscose solution. The modifying effect is demonstrated when the spinning bath contains zinc ions in addition to sulfuric acid and sodium sulfate, as in the case of other conventional modifiers. The concentration of zinc sulfate in the spinning bath should be within the range from about 15 to about 100 grams per liter, and preferably from about 30 to about 80 grams per liter.

The hydroxyalkyloxyalkyleneaminomethyl phenols of the invention can also be added to the cellulose during the mercerization to the alkali cellulose, or to the viscose or cuprammonium solution, in which event they are referred to as "additives." In order to obtain an improvement in filterability, however, the compounds should be added before termination of the xanthation or cuprammonium reaction. The hydroxyalkyloxyalkyleneaminomethyl phenols of the invention when added as additives should be in an amount within the range from about 0.01 to about 0.5 percent, and preferably from about 0.05 to about 0.3 percent, based on the cellulose.

The following Examples in the opinion of the inventors represent preferred embodiments of their invention:

EXAMPLE A

Para-nonylphenol 220 g (1 mole) and 210 g diethanolamine (2 moles) were mixed in a reaction flask. There was then added drop by drop, with stirring, 175 g of a 35 percent aqueous formaldehyde solution (2 moles). The reaction temperature was held at 30°C. for one hour, and was then raised to 90°C., and held at this temperature for an additional six hours. The water produced in the course of the reaction was distilled off at 90°C., under a vacuum of 20 mm of mercury. The viscous faintly yellow product obtained was analyzed to determine tertiary basic nitrogen, and thereby to assess the percent conversion. The content of tertiary nitrogen amounted to 3.3 mmoles/gm, corresponding to a yield of 75 percent.

The reaction product was then ethoxylated with 30 moles of ethylene oxide per mole of nonylphenol, in an autoclave provided with a thermostat and fast agitator, and equipped with means for injecting gas under superatmospheric pressure. The addition was carried out at a temperature of 100°C., and a pressure of 3 kp/sq.cm. The product obtained was a liquid of low viscosity, consisting predominantly of ethoxylated, 2,6-bis-(diethanolaminomethyl)-4-nonyl-phenol, containing approximately 34 moles of oxyethylene units per mole.

EXAMPLE B

Para-nonylphenol 220 g (1 mole) and 266 g dipropanolamine (2 moles) were mixed in a reaction flask. There was then added drop by drop, with stirring, 175 g of a 35 percent formaldehyde solution (2 moles). The reaction temperature was held at 30°C., for one hour and was then raised to 90°C., and held at this temperature for an additional six hours. The water produced in the course of the reaction was then distilled off at 90°C., under a vacuum of 20 mm of mercury. The viscous faintly yellow product obtained was analyzed to determine tertiary basic nitrogen, and thereby to assess the percent conversion. The content of tertiary nitrogen amounted to 2.7 mmoles/gm, corresponding to a yield of 70 percent.

The reaction product was then ethoxylated with 35 moles of ethylene oxide per mole of nonylphenol, in an autoclave provided with a thermostat and fast agitator, and equipped with means for injecting gas under superatmospheric pressure. The addition was carried out at a temperature of 100°C., and a pressure of 3 kp/sq.cm. The product obtained was a liquid of low viscosity consisting predominantly of ethoxylated 2,6-bis(dipropanolaminomethyl)-4-nonyl-phenol, containing approximately 39 moles of oxyethylene units per mole.

EXAMPLE C o,p-Xylenol 122 g (1 mole) and 105 g diethanolamine (1 mole) were mixed in a reaction flask. There was then added drop by drop, with stirring, 87.5 g of a 35 percent formaldehyde solution (1 mole). The reaction temperature was held at 30°C., for one hour and was then raised to 90°C., and held at this temperature for an additional six hours. The water produced in the course of the reaction was then distilled off at 90°C., under a vacuum of 20 mm of mercury. The viscous faintly yellow product obtained was analyzed to determine tertiary basic nitrogen and thereby to assess the percent conversion. The content of tertiary nitrogen amounted to 2.7 mmoles/gm corresponding to a yield of 64 percent.

The reaction product was then ethoxylated with 20 moles of ethylene oxide per mole of xylenol, in an autoclave provided with a thermostat and fast agitator, and equipped with means for injecting gas under superatmospheric pressure. The addition was carried out at a temperature of 100°C., and a pressure of 3 kp/sq.cm. The product obtained was a liquid of low viscosity consisting predominantly of ethoxylated 2-diethylaminomethyl-4,6-di-methyl-phenol, containing approximately 29 moles of oxyethylene units per mole.

EXAMPLE D

Para-nonylphenol 220 g (1 mole) and 210 g N-amino-ethylethanolamine (2 moles) were mixed in a reaction flask. There was then added, drop by drop, with stirring, 175 g of a 35 percent formaldehyde solution (2 moles). The reaction temperature was held at 30°C., for one hour and was then raised to 90°C., and held at this temperature for an additional six hours. The water produced in the course of the reaction was then distilled off at 90°C., under a vacuum of 20 mm of mercury. The viscous faintly yellow product obtained was analyzed to determine tertiary basic nitrogen, and thereby to assess the percent conversion. The content of tertiary nitrogen amounted to 3.4 mmoles/gm, corresponding to a yield of 77 percent.

The reaction product was then ethoxylated with 20 moles of ethylene oxide per mole of nonylphenol, in an autoclave provided with a thermostat and fast agitator, and equipped with means for injecting gas under superatmospheric pressure. The addition was carried out at a temperature of 100°C., and a pressure of 3 kp/sq.cm. The product obtained was a liquid of low viscosity consisting predominantly of ethoxylated 2,6-bis-(ethanolaminoethylaminomethyl)-4-nonyl-phenol, containing approximately 22 moles of oxyethylene units per mole.

EXAMPLE E

Para-nonylphenol 220 g (1 mole) and 125 g monoethanolamine (2 moles) were mixed in a reaction flask. There was then added drop by drop, with stirring, 175 g of a 35 percent formaldehyde solution (2 moles). The reaction temperature was held at 30°C., for one hour and was then raised to 90°C., and held at this temperature for an additional six hours. The water produced in the course of the reaction was then distilled off at 90°C., under a vacuum of 20 mm of mercury. The viscous faintly yellow product obtained was analyzed to determine tertiary basic nitrogen and thereby to assess the percent conversion. The content of tertiary nitrogen amounted to 4.3 mmoles/gm, corresponding to a yield of 80 percent.

The reaction product was then ethoxylated with 40 moles of ethylene oxide per mole of nonylphenol, in an autoclave provided with a thermostat and fast agitator, and equipped with means for injecting gas under superatmospheric pressure. The addition was carried out at a temperature of 100°C., and a pressure of 3 kp/sq.cm. The product obtained was a liquid of low viscosity consisting predominantly of ethoxylated 2,6-bis-(ethanolaminomethyl)-4-nonyl-phenol, containing approximately 42 moles of oxyethylene units per mole.

EXAMPLE F

Para-nonylphenol 220 g (1 mole) and 58 g of aqueous ammonia (2 moles) solution were mixed in a reaction flask. There was then added drop by drop, with stirring, 175 g of a 35 percent formaldehyde solution (2 moles). The reaction temperature was held at 30°C., for one hour and was then raised to 90°C., and held at this temperature for an additional six hours. The water was then distilled off at 90°C., under a vacuum of 20 mm of mercury.

The reaction product was then ethoxylated with 5 moles of ethylene oxide per mole of nonylphenol, after which the water produced was distilled off in an autoclave provided with a thermostat and fast agitator and equipped with means for injecting gas under superatmospheric pressure. A further 30 moles of ethylene oxide were then added. The addition was carried out at a temperature of 100°C., and a pressure of 3 kp/sq.cm. The product obtained was a liquid of low viscosity consisting predominantly of ethoxylated 2,6-bis-(aminomethyl)-4-nonyl-phenol, containing approximately 35 moles of oxyethylene units per mole.

EXAMPLE G

Para-nonylphenol 220 g (1 mole) and 210 g diethanolamine (2 moles) were mixed in a reaction flask. There was then added drop by drop, with stirring, 175 g of a 35 percent formaldehyde solution (2 moles). The reaction temperature was held at 30°C., for one hour and was then raised to 90°C., and held at this temperature for an additional six hours. The water produced in the course of the reaction was then distilled off at 90°C., under a vacuum of 20 mm of mercury. The viscous faintly yellow product obtained was analyzed to determine tertiary basic nitrogen and thereby to assess the percent conversion. The content of tertiary nitrogen amounted to 3.3 mmoles/gm, corresponding to a yield of 75 percent.

The reaction product was then ethoxylated with 34 moles of ethylene oxide per mole of nonylphenol in an autoclave provided with a thermostat and fast agitator, and equipped with means for injecting gas under superatmospheric pressure. The addition was carried out at a temperature of 100°C., and a pressure of 3 kp/sq.cm. Thereupon, the temperature was raised to 130°C., and 5 moles of propylene oxide per mole of nonylphenol were added, under a pressure of 3.5 kp/sq.cm. The product obtained was a liquid of low viscosity consisting predominantly of ethoxylated propoxylated 2,6-bis(diethanolaminomethyl)-4-nonyl-phenol, containing approximately 34 moles of oxyethylene units per mole, and 5 moles oxypropylene units per mole.

The following examples illustrate the utilization of the above-exemplified hydroxyalkyloxyalkyleneaminomethyl phenols of the invention in the production of regenerated cellulose:

EXAMPLE 1

Alkali cellulose was produced by sheet mercerization of a prehydrolyzed sulfate pulp in the customary way. The alkali cellulose was then xanthated with 39 percent carbon disulfide for 150 minutes at 27°C. The cellulose xanthate thus obtained was dissolved in sodium hydroxide, to produce a viscose solution containing 6.7 percent cellulose and 5.9 percent sodium hydroxide. One of the compounds listed below, in Table I, was then added to the viscose solution, in an amount of 3 percent by weight of the cellulose content of the viscose. The viscose solution was filtered and aged to a salt point of 7.9 (gamma = 46), and a viscosity of 60 SKF (see Kurt Gotze, *Chemiefasern*, 3rd Edition, Springer Verlag, Berlin/Heidelberg 1967, 43 h., p. 1181).

The viscose solution was preheated to 45°C., and spun through a spinneret having 1500 holes of 40 μm diameter through a tube having a length of 500 mm and a diameter of 12 mm, into a spinning bath having the composition: 73 g $H_2SO_4$/liter, 72 g $ZnSO_4$/liter, and 140 g $Na_2SO_4$/liter, at a temperature of 55°C.

Following the spinning bath, the filaments were stretched 100 percent in a stretching bath containing 30 g $H_2SO_4$/liter, at 95°C., the spinning rate following the stretching bath amounting to 45 m/min. The filament was after-treated, dried and twisted in the customary way, to give a silk of 1670 denier and a cord the twist S/Z 472/472 windings/m of 3800 denier.

The strength of the rayon silk and cord produced by this method was determined after the threads had been dried for three hours at 105° to 110°C. The results are reported in Table I.

TABLE I

| Modifier of Example No. | Strength | |
|---|---|---|
| | Silk 1670 denier pond/denier | Cord 3800 denier kilopond |
| Reaction product of one mole of cresol, two moles of formaldehyde and two moles of diethanolamine to which 20 moles of ethylene oxide had been added, according to U.S. patent No. 3,558,336 | 6.10 | 17.05 |
| Example A | 6.49 | 17.60 |
| Example B | 6.28 | 17.42 |
| Example C | 6.40 | 17.36 |
| Example G | 6.45 | 17.50 |

It is apparent from the above results that the modifiers in accordance with the invention, as compared to the modifier of U.S. Pat. No. 3,558,336, gave a substantially improved strength both in the rayon silk and in the cord.

The fatigue resistance of the cord samples was determined using the Firestone and Vibrator methods. The conditions used were the same as the strength test. The results are stated in Table II, in relative units, with the fatigue resistance of the cords produced with the modifier of U.S. Pat. No. 3,558,336 arbitrarily assigned the value of 100. The higher the value, the greater the fatigue resistance.

TABLE II

| Modifier of Example No. | Firestone test rel. units | Vibrator test rel. units |
|---|---|---|
| Reaction product of one mole of cresol, two moles of formaldehyde and two moles of diethanol amine to which 20 moles of ethylene oxide had been added, according to U.S. patent No. 3,558,336 | 100 | 100 |
| Example A | 120 | 114 |
| Example B | 121 | 106 |
| Example C | 108 | 103 |
| Example G | 115 | 112 |

Thus, the fatigue resistance is improved when modifiers in accordance with the invention are employed. The improvement can reach 20 percent or more, as compared to the control, which is a very considerable improvement. In the test using the modifier of Example G, there was at the same time a deaeration of the cellulose and a reduced foaming, while the time for deaeration could be reduced, compared with the modifier of Example A which, except for the oxypropylene units, is otherwise comparable in molecular structure to the modifier of Example G. This shows the defoaming and deaerating effect of the oxypropylene units.

EXAMPLE 2

To a viscose produced from a sulfite pulp with 0.53 percent extract content (dichloromethane-soluble + ethanol-soluble) and of the composition 7 percent cellulose and 5.8 percent sodium hydroxide, there was added, per liter of viscose, 0.2 g of the compounds listed in Table III. The relatively high extract content in this viscose solution causes the solution to be cloudy, and such a solution would quickly clog the spinneret openings, if no viscose additive were incorporated. Following the addition of the compounds listed in Table III, the light transmission was measured in a Lumetron Colorimeter Model 402-E. The results obtained are set forth in Table III.

TABLE III

| Viscose Additive of Example No. | Light Transmission, % | |
|---|---|---|
| | 4 hours after addition | 24 hours after addition |
| Reaction product of one mole of cresol, two moles of formaldehyde and two moles of diethanolamine, to which 20 moles of ethylene oxide had been added, according to U.S. patent No. 3,558,336 | 32 | 22 |
| Example A | 80 | 76 |
| Example B | 68 | 65 |
| Example C | 29 | 27 |
| Example G | 80 | 71 |
| Example D | 54 | 63 |
| Example E | 71 | 68 |
| No addition (control) | 11 | 10 |

The results show the considerable reduction in cloudiness due to the addition of the compounds of the invention, in terms of a considerable increase in light transmission measured.

EXAMPLE 3

Alkali cellulose was prepared by the mercerization of a sulfite pulp with a 19 percent sodium hydroxide solution, in the customary way. After squeezing, grinding and prematuring, the alkali cellulose was xanthated with 36 percent carbon disulfide, based on the cellulose content. The cellulose xanthate was dissolved in a sodium hydroxide solution having added to it a viscose additive in accordance with Example A, giving a viscose solution having the composition 7.4 percent cellulose, 0.3 percent viscose additive calculated on the cellulose, and 6.1 percent sodium hydroxide. The viscose solution was filtered and after-matured to a salt point of 5.8, after which the solution was spun on a Maurer laboratory spinning machine, into a spinning bath containing 140 g sulfuric acid, 240 g $Na_2SO_4$ and 18 g $ZnSO_4$/liter at a temperature of 60°C. In this manner, rayon silk of 300 denier with 40 single filaments was produced. The degree of milkiness in these samples was then determined according to the method of H. Jonson and S. O. Regestad (*Svensk Papperstidning* 67 (1964) pp. 24,990). The results obtained are summarized in Table IV.

TABLE IV

| Viscose Additive of Example No. | Degree of Milkiness[1] |
|---|---|
| Example A | 6.9 |
| Without additive | 12.2 |

[1]Reflectance in %, measured with Elrepho Reflection Meter (the lower the reflectance, the less the milkiness).

The results show that the addition of the compound of the invention greatly reduces the degree of milkiness.

EXAMPLE 5

Onto sheets of a prehydrolyzed sulfate pulp, there were sprayed aqueous solutions containing 200 g per liter of one of the modifiers of Examples A, B, D, or E, so as to produce a coating of 1 g of additive per kilogram of pulp. The sheets were conditioned at 25°C. in a relative humidity of 65 percent for 24 hours, and then mercerized in an 18 percent sodium hydroxide solution and xanthated with 28 percent $CS_2$, producing a viscose solution containing 9.2 percent cellulose and 7.5 percent sodium hydroxide. Filterability of this viscose solution was then determined in the manner described in *ZELLCHEMING-Merkblatt* III/6a/68. The filter surface area was 4 sq.cm., and as the filter a Grycksbo viscose filter No. 702 was used. The pressure was 2 kp/sq.cm. As a measure of filterability $$F_{HK} = (2 - 2) \cdot (k/50)^{0.4} \cdot F_W$$

is set forth, where k is the falling-ball viscosity and $F_W$ is determined according to Hermans-Bredee's standard law (see *Svensk Papperstidning* 58 (1955) p. 67). The higher the $F_{HK}$ value, the better the filterability.

The results obtained are summarized in Table V.

TABLE V

| Additive of Example No. | $F_{HK}$ |
|---|---|
| Additive of Patent No. 3,558,336 | 958 |
| Example A | 1210 |
| Example B |  |
| Example D | 1123 |
| Example E | 1048 |
| No additive | 668 |

The results show that the filterability of the viscose solution is substantially improved by addition of the additives of the invention. A considerable increase in filterability is obtained, even compared with the product in accordance with U.S. Pat. No. 3,558,336.

Having regard to the foregoing disclosure, the following is claimed as the inventive and patentable embodiments thereof:

1. In the process for the production of regenerated cellulose according to the viscose process, the improvement which comprises effecting regeneration of the cellulose in the presence of an amount within the range from about 0.01 to about 5 percent by weight of the cellulose of a hydroxyalkyloxyalkyleneaminomethyl phenol having the formula:

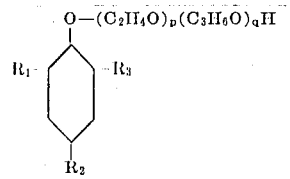

wherein $R_1$, $R_2$, and $R_3$ are selected from the group consisting of
 a. one alkyl group having from about five to about twelve carbon atoms;
 b. two alkyl groups having from about one to about four carbon atoms;
 c. the remaining two or one R substituents being

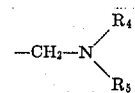

groups, wherein at least one of $R_4$ and $R_5$ is selected from the group consisting of
 i. $C_nH_{2n} O(C_2H_4O)_p(C_3H_6O)_qH$; and
 ii. $(C_2H_4O)_p(C_3H_6O)_qH$
and the remaining $R_4$ or $R_5$ is selected from (i), (ii), and iii. lower alkyl having from one to about four carbon atoms; and (IV) 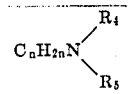

wherein $R_4$ and $R_5$ are selected from (i), (ii) and (iii), and at least one is (i) or (ii):
 p is a number within the range from about one to about thirty, and the total number of $C_2H_4O$ units is within the range from about 10 to about 70;
 q is a number within the range from zero to about two, and the total number of $C_3H_6O$ units is within the range from zero to about seven; and
 n is a number within the range from about one to about four.

2. A process according to claim 1, in which the

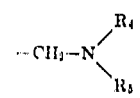

groups are selected from the group consisting of:

(a)

(b)

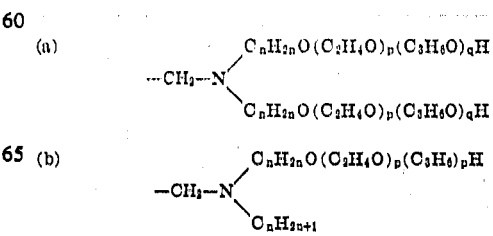

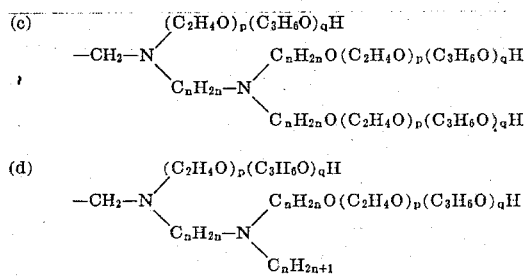

3. A process according to claim 1, in which the hydroxyalkyloxyalkyleneaminomethyl phenol has the formula:

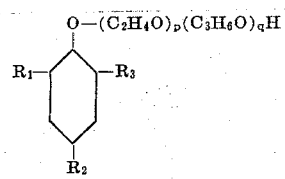

where one of $R_1$, $R_2$, and $R_3$ is an alkyl group having from about five to about twelve carbon atoms, and the two remaining R substituents are selected from the group consisting of

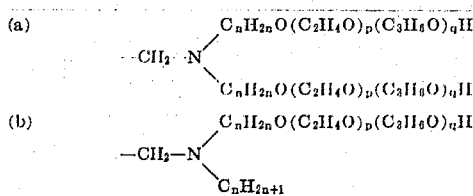

where each $p$ is a number within the range from two to about 25 and selected such that the total number of $C_2H_4O$ units in the general formula is within the range from 20 to 50, each $q$ is a number within the range from zero to two and selected such that the total number of $C_3H_6O$ units in the general formula is within the range from zero to seven, and each $n$ is a number with the range from one to three.

4. A process according to claim 1, in which the oxyalkyloxyalkyleneaminomethyl phenol has the formula:

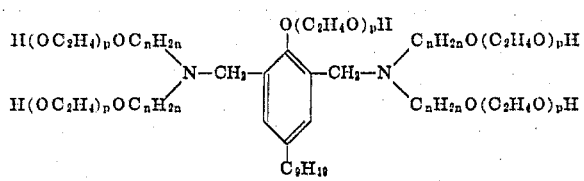

$p$ is a number within the range from about two to about 20 and is selected so that the total number of $C_2H_4O$ units in the molecule is within the range from about 20 to about 40; and $n$ is 2 or 3.

5. A process according to claim 1, in which the hydroxyalkyloxyalkyleneaminomethyl phenol is added in an amount within the range from about 0.4 to about 5 percent by weight of the cellulose.

6. A process according to claim 1, in which the hydroxyalkyloxyalkyleneaminomethyl phenol is added to a member selected from the group consisting of (1) the cellulose during the mercerization, (2) the alkali cellulose, or (3) the viscose in an amount within the range from about 0.01 to about 0.5 percent by weight of the cellulose.

7. A process according to claim 1, in which the hydroxyalkyloxyalkyleneaminomethyl phenol is added to a member selected from the group consisting of (1) the cellulose xanthogenate, and (2) the viscose in an amount of within the range from about 0.4 to about 5 percent by weight of the cellulose.

8. A process according to claim 1, in which the hydroxyalkyloxyalkyleneaminomethyl phenol is added to the spinning bath in an amount within the range from about 5 to about 2000 ppm in the spinning bath.

9. A viscose solution comprising cellulose in aqueous alkaline solution and an amount within the range from about 0.01 to about 5 percent by weight of the cellulose of a hydroxyalkyloxyalkyleneaminomethyl phenol having the formula:

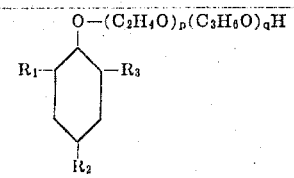

wherein $R_1$, $R_2$, and $R_3$ are selected from the group consisting of
 a. one alkyl group having from about five to about 12 carbon atoms;
 b. two alkyl groups having from about one to about four carbon atoms;
 c. the remaining two or one R substituents being

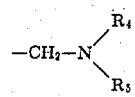

groups, wherein at least one of $R_4$ and $R_5$ is selected from the group consisting of
 i. $C_nH_{2n}O(C_2H_4O)_p(C_3H_6O)_qH$; and
 ii. $(C_2H_4O)_p(C_3H_6O)_qH$
and the remaining $R_4$ or $R_5$ is selected from (i), (ii), and iii. lower alkyl having from one to about four carbon atoms; and (iv) 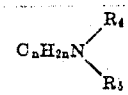

wherein $R_4$ and $R_5$ are selected from (i), (ii) and (iii), and at least one is (i) or (ii);

- $p$ is a number within the range from about one to about 30, and the total number of $C_2H_4O$ units is within the range from about 10 to about 70;
- $q$ is a number within the range from about zero to about two, and the total number of $C_3H_6O$ units is within the range from zero to about seven; and
- $n$ is the number within the range from about one to about four.

10. A viscose solution according to claim 9 in which the

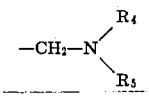

groups are selected from the group consisting of:

(a)  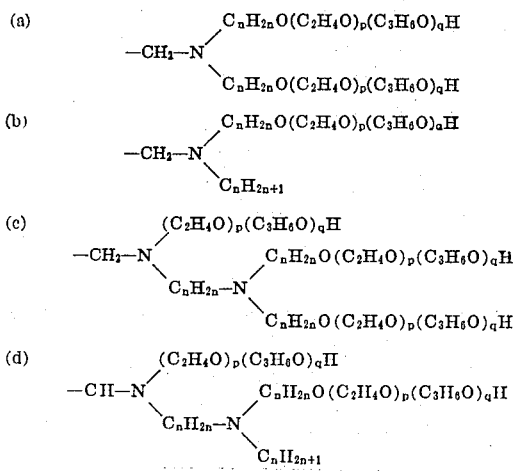

(b)

(c)

(d)

11. A viscose solution according to claim 9 in which the hydroxyalkyloxyalkyleneaminomethyl phenol has the formula:

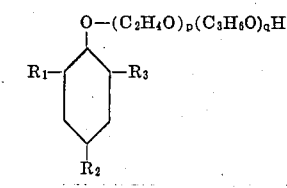

where one of $R_1$, $R_2$, and $R_3$ is an alkyl group having from about five to about twelve carbon atoms, and the two remaining R substituents are selected from the group consisting of (a)  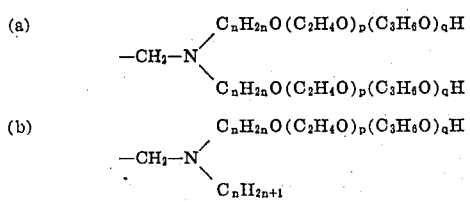

(b)

where each $p$ is a number within the range from two to about 25 and selected such that the total number of $C_2H_4O$ units in the general formula is within the range from 20 to 50, each $q$ is a number within the range from zero to two and selected such that the total number of $C_3H_6O$ units in the general formula is within the range from zero to seven, and each $n$ is a number within the range from one to three.

12. A viscose solution according to claim 9 in which the hydroxyalkyloxyalkyleneaminomethyl phenol has the formula:

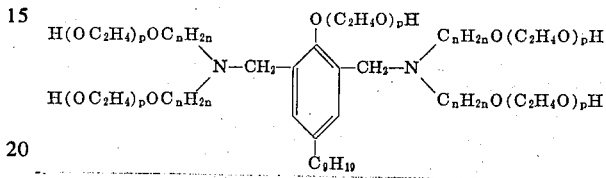

$p$ is a number within the range from about two to about 20 and is selected so that the total number of $C_2H_4O$ units in the molecule is within the range from about 20 to about 40; and $n$ is 2 or 3.

13. A spinning bath comprising an aqueous solution of sulfuric acid, sodium sulfate, zinc sulfate in an amount within the range from about 15 to about 100 g/l and an amount within the range from about 5 to about 2000 ppm of a hydroxyalkyloxyalkyleneaminomethyl phenol having the formula:

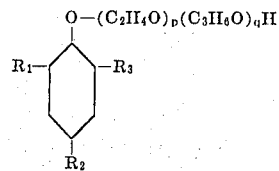

wherein $R_1$, $R_2$, and $R_3$ are selected from the group consisting of a. one alkyl group having from about five to about twelve carbon atoms;

b. two alkyl groups having from about one to about four carbon atoms;

c. the remaining two or one R substituents being

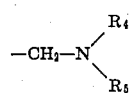

groups, wherein at least one of $R_4$ and $R_5$ is selected from the group consisting of i. $C_nH_{2n}O(C_2H_4O)_p(C_3H_6O)_qH$; and ii. $(C_2H_4O)_p(C_3H_6O)_qH$ and the remaining $R_4$ or $R_5$ is selected from (i), (ii), and iii. lower alkyl having from one to about four carbon atoms; and (iv) 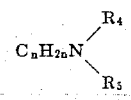

wherein $R_4$ and $R_5$ are selected from (i), (ii) and (iii), and at least one is (i) or (ii);

$p$ is a number within the range from about one to about thirty, and the total number of $C_2H_4O$ units is within the range from about 10 to about 70;

$q$ is a number within the range from zero to about two, and the total number of $C_3H_6O$ units is within the range from zero to about seven; and $n$ is a number within the range from about one to about four.

14. A spinning bath according to claim 13 in which the

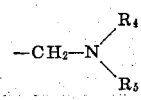

groups are selected from the group consisting of:

(a), (b), (c), (d) [structural formulas]

15. A spinning bath according to claim 13 in which the hydroxyalkyloxyalkyleneaminomethyl phenol has the formula:

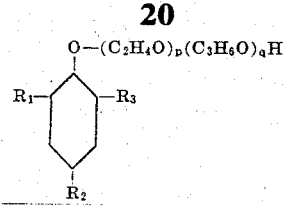

where one of $R_1$, $R_2$, and $R_3$ is an alkyl group having from about five to about twelve carbon atoms, and the two remaining R substituents are selected from the group consisting of (a), (b) [structural formulas]

where each $p$ is a number within the range from 2 to about 25 and selected such that the total number of $C_2H_4O$ units in the general formula is within the range from 20 to 50, each $q$ is a number within the range from zero to two and selected such that the total number of $C_3H_6O$ units in the general formula is within the range from zero to seven, and each n is a number within the range from one to three.

16. A spinning bath according to claim 13 in which the hydroxyalkyloxyalkyleneaminomethyl phenol has the formula:

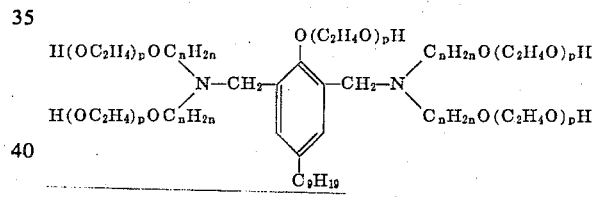

$p$ is a number within the range from about two to about 20 and is selected so that the total number of $C_2H_4O$ units in the molecule is within the range from about 20 to about 40; and $n$ is 2 or 3.

* * * * *